E. C. NORTHRUP.
BOX MAKING MACHINE.
APPLICATION FILED FEB. 23, 1909.
1,058,894.
Patented Apr. 15, 1913.
8 SHEETS—SHEET 5.
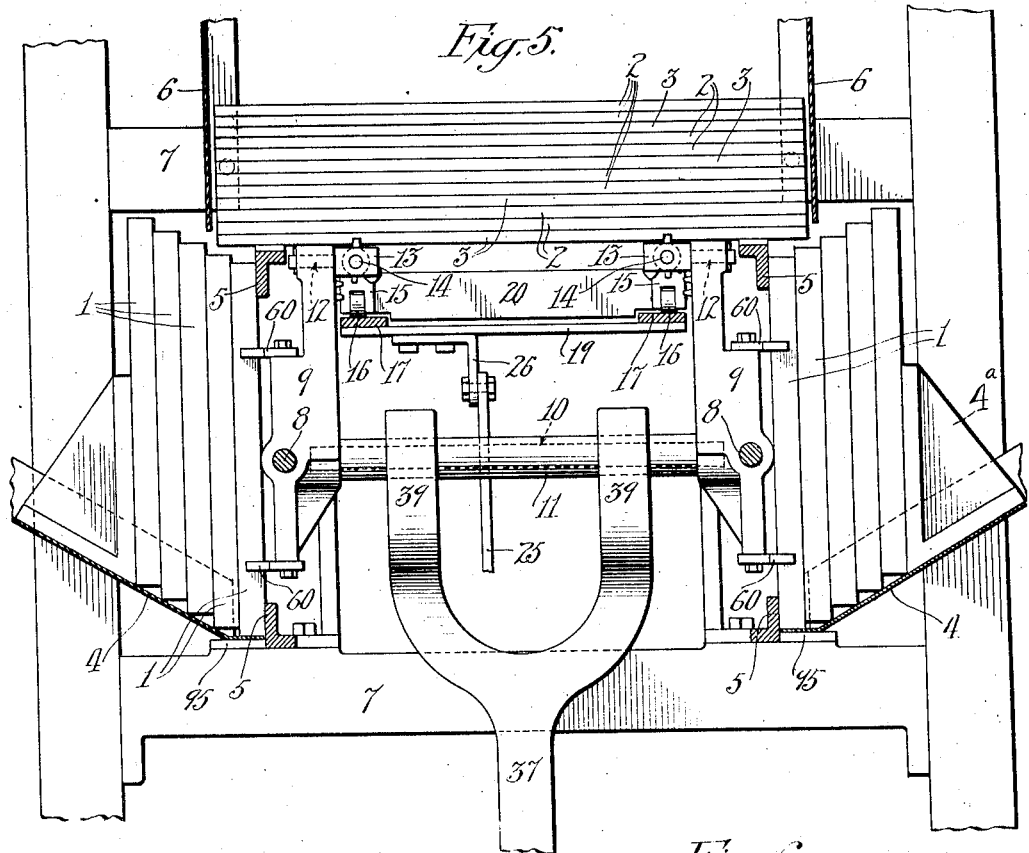
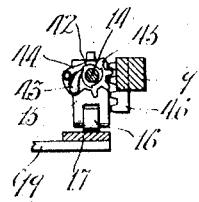
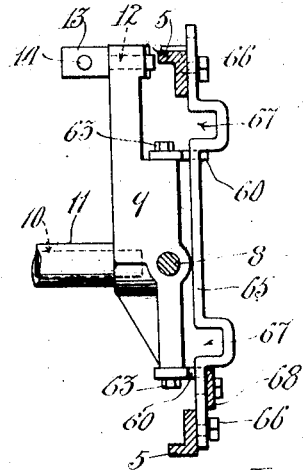
Inventor,
Elmer C. Northrup.

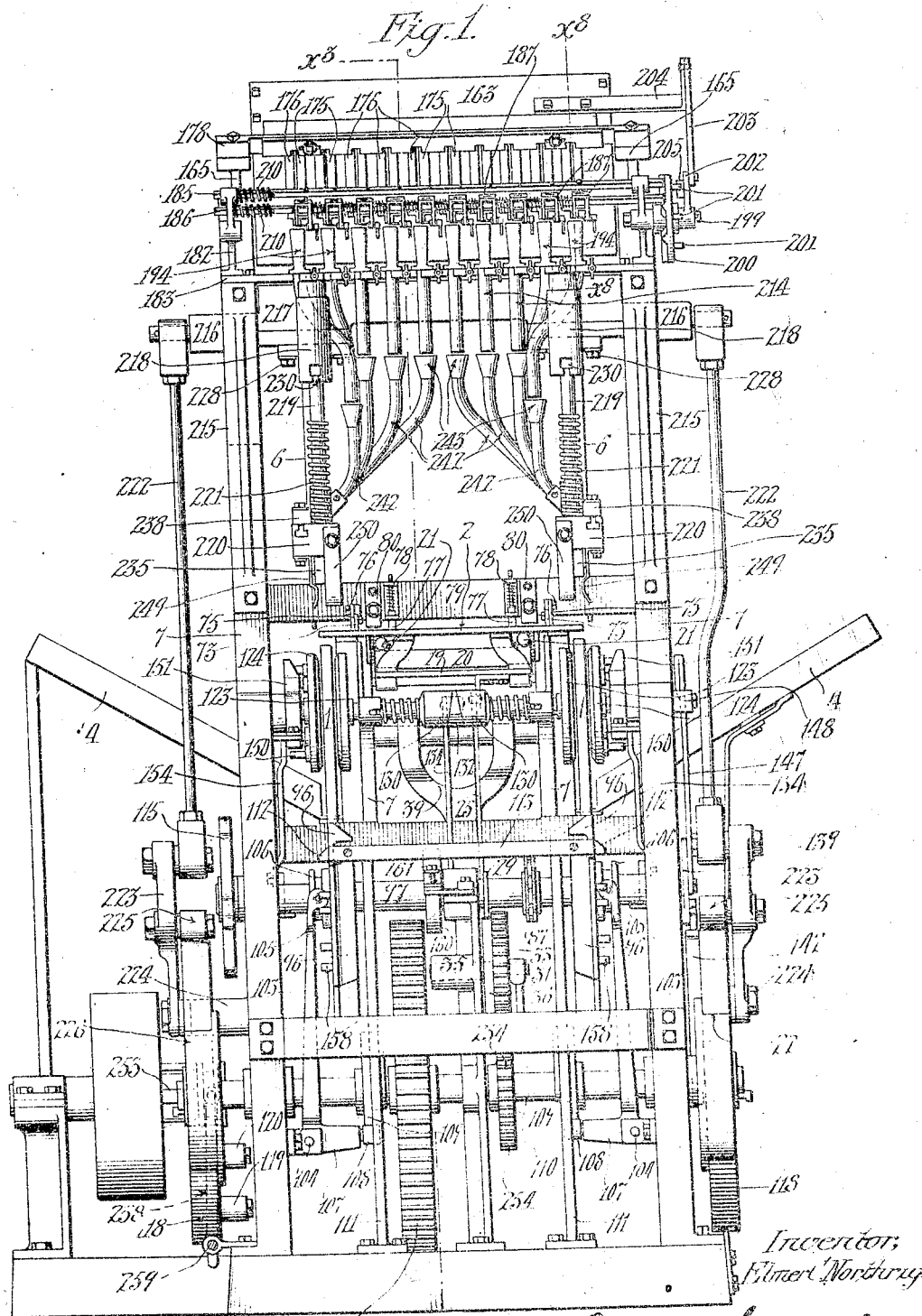

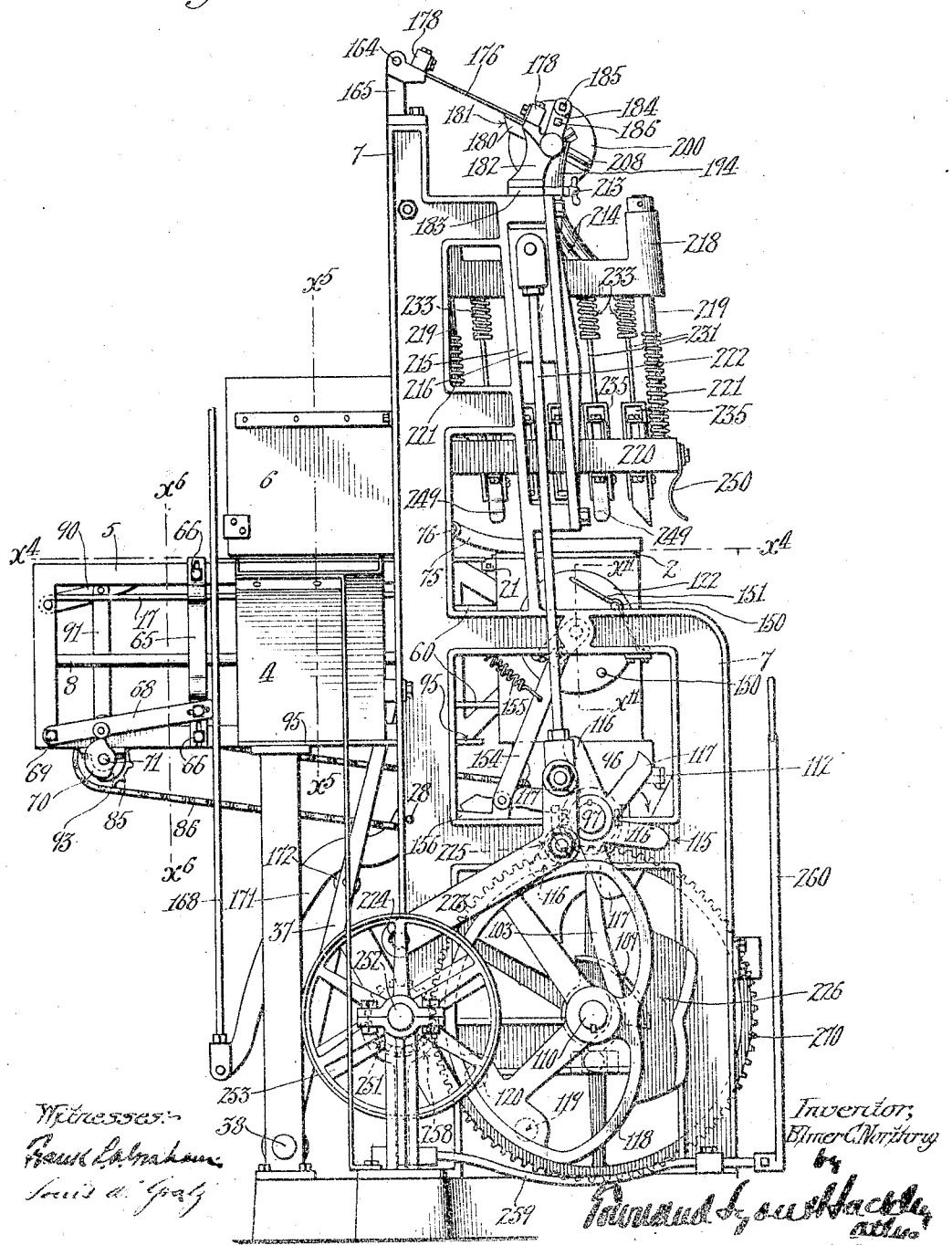

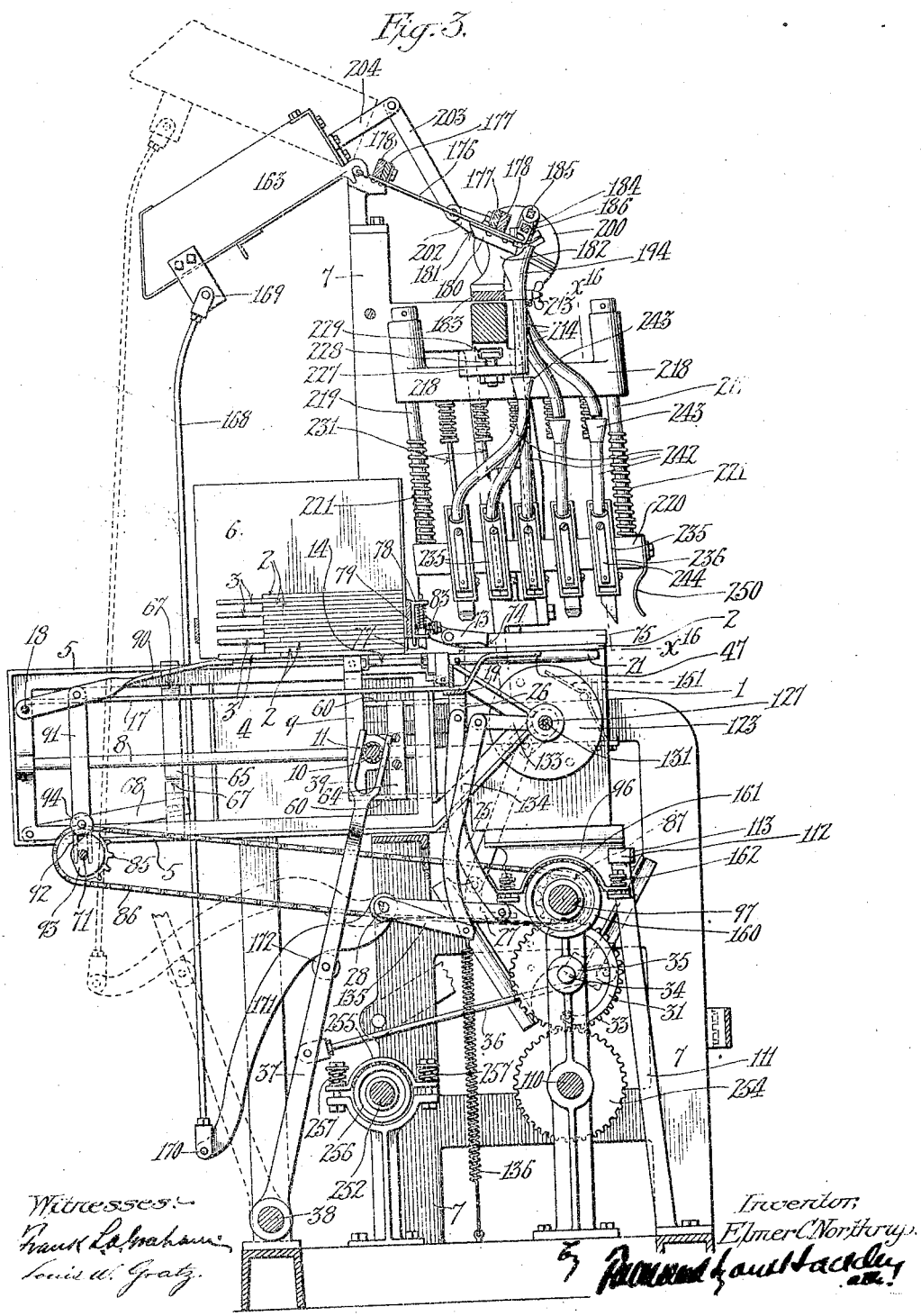

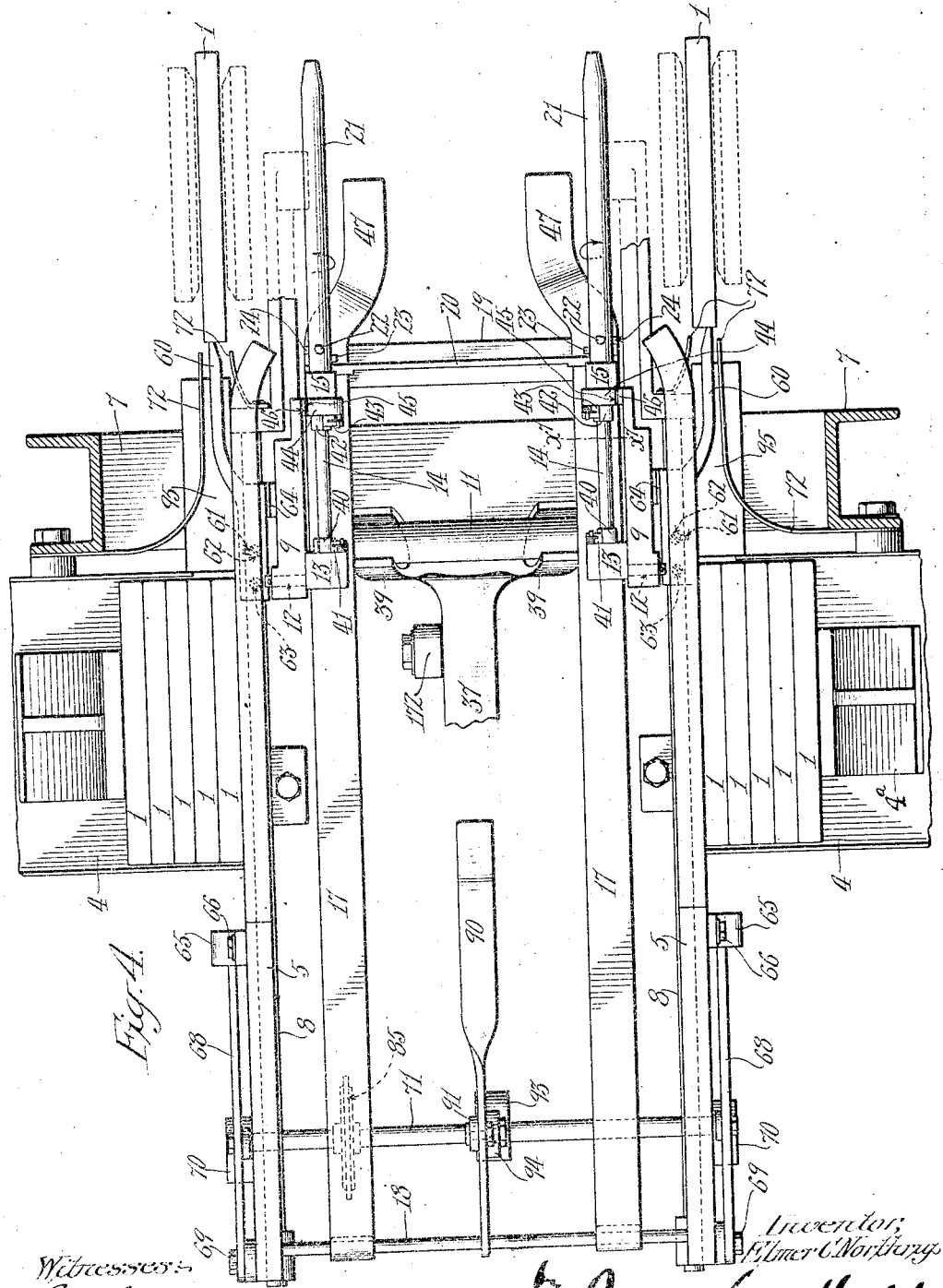

E. C. NORTHRUP.
BOX MAKING MACHINE.
APPLICATION FILED FEB. 23, 1909.
1,058,894.
Patented Apr. 15, 1913.
8 SHEETS—SHEET 6.
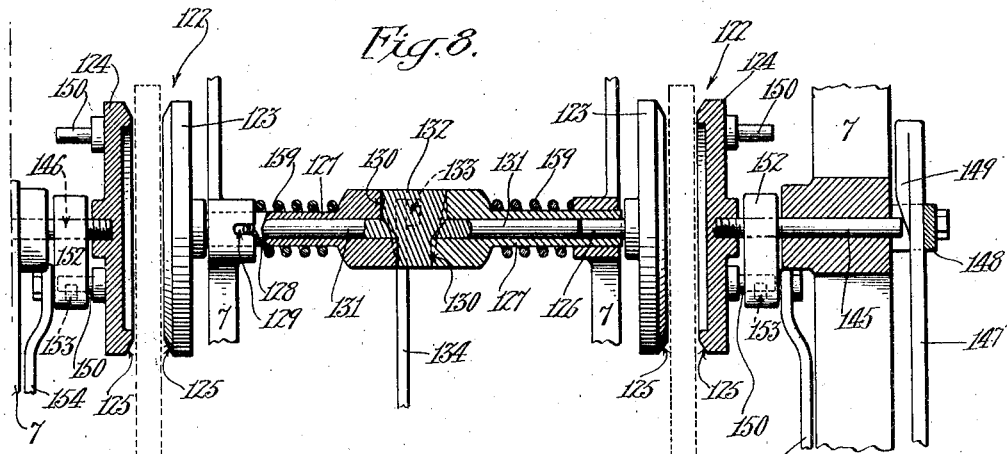
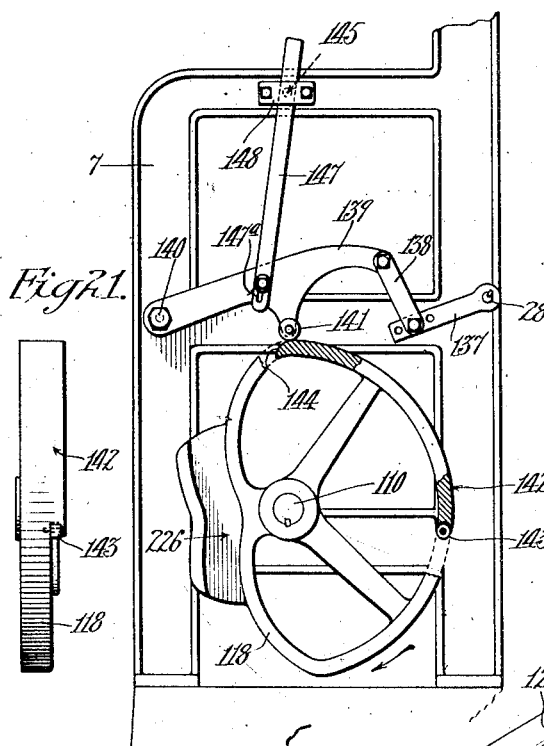
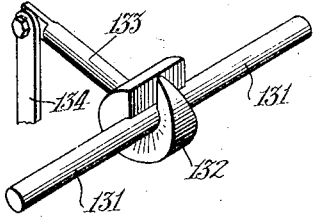
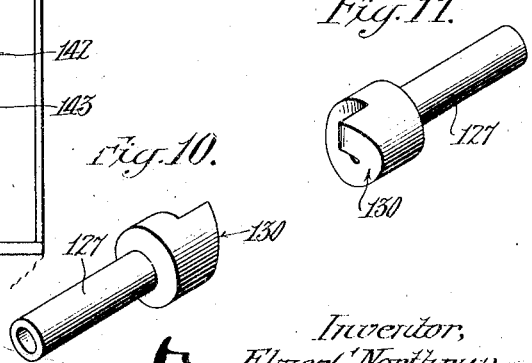
Inventor,
Elmer C. Northrup.

E. C. NORTHRUP.
BOX MAKING MACHINE.
APPLICATION FILED FEB. 23, 1909.
1,058,894.
Patented Apr. 15, 1913.
8 SHEETS—SHEET 7.
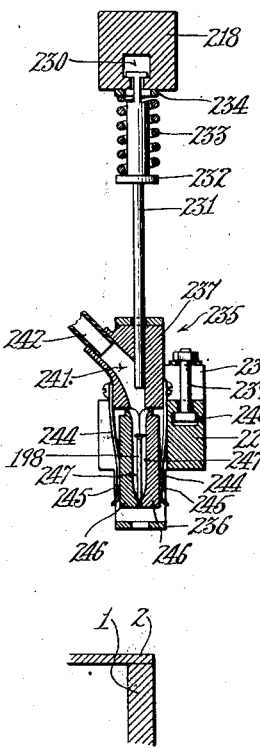
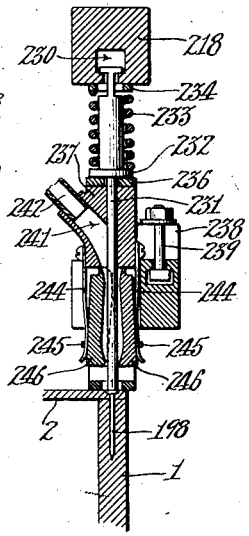
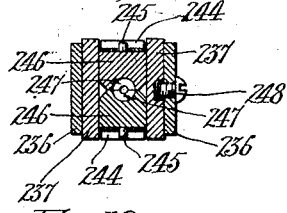
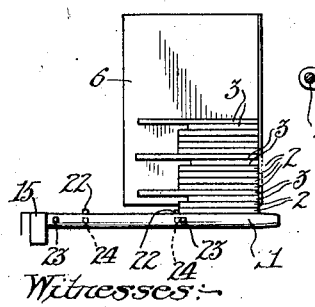
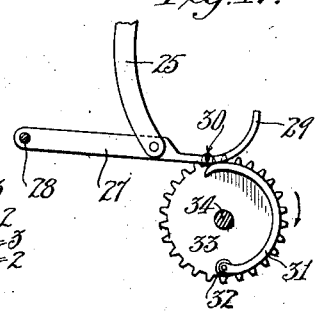
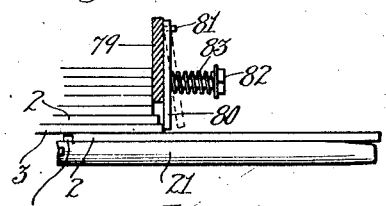
Witnesses:—
Frank L. Graham
Louis W. Gratz
Inventor:
Elmer C. Northrup
by Hackley
atty

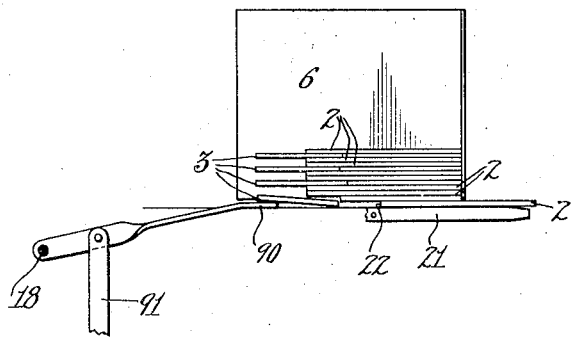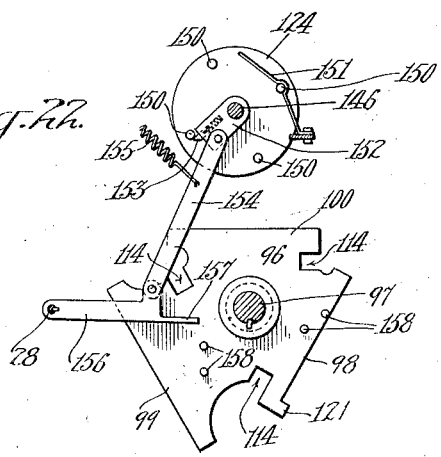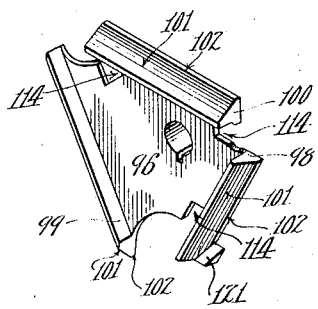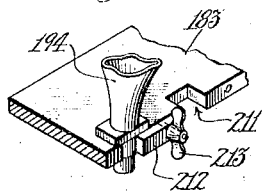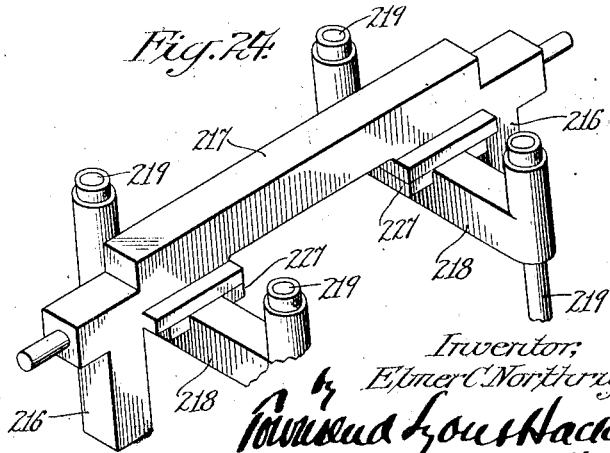

UNITED STATES PATENT OFFICE.

ELMER C. NORTHRUP, OF LOS ANGELES, CALIFORNIA, ASSIGNOR TO AUTOMATIC MACHINE COMPANY, OF SAN FRANCISCO, CALIFORNIA, A CORPORATION OF CALIFORNIA.

BOX-MAKING MACHINE.

1,058,894.

Specification of Letters Patent. Patented Apr. 15, 1913.

Application filed February 23, 1909. Serial No. 479,640.

*To all whom it may concern:*

Be it known that I, ELMER C. NORTHRUP, a citizen of the United States, residing at Los Angeles, in the county of Los Angeles and State of California, have invented a new and useful Box-Making Machine, of which the following is a specification.

This invention relates to a box making machine of the automatic type, and one of the main objects of the invention is to enable the use of a two or three piece side or bottom, if desired. In automatic machines for making boxes (not crates) heretofore it has been necessary to use a single piece of board for each side or bottom. By constructing the sides or bottoms of two or more narrow pieces of wood a considerable economy in the cost of material is attained.

Another object is to drive the nails in aslant so that each nail will pass through more than one grain of the wood and thus more securely anchor the nail, and also enable the use of a lighter nail.

Another object is to provide for automatically compensating the nail drivers for different thicknesses of shook.

Another object is to provide a rotating support or table for holding the parts of the box while in process of its formation which will automatically accommodate the variation between the height and width of the box.

Another object is to feed the boards for the ends, sides and bottoms into the machine from one point, thus making it easier to supply the machine with material as the operator can stand in one position in placing the boards in the machine.

Another object is to automatically expel the completed box by the incoming material which is to form the next box thereby dispensing with unnecessary machine parts for expelling the completed box.

Another object is to employ a cam for turning the table and so construct the machine that while the cam is moving through the non-working portion of its cycle the other parts of the machine are assembling the parts of the box.

Another object is to so construct the machine and time the operation of the various parts that the parts will remain idle but a minimum length of time, it being the aim to have all the parts at work as much of the time as possible and thereby greatly reduce the time required for completing a box.

Referring to the drawings: Figure 1 is a front elevation of the machine. Fig. 2 is an elevation of the left side of the machine. Fig. 3 is a vertical section taken through the machine on line $x^3$—$x^3$ Fig. 1. Fig. 4 is a longitudinal cross section on an enlarged scale on line $x^4$—$x^4$ Fig. 2. Fig. 5 is a vertical section on an enlarged scale taken on line $x^5$—$x^5$ Fig. 2. Fig. 6 is a vertical section on an enlarged scale on line $x^6$—$x^6$ Fig. 2. Fig. 7 is a section on line $x^7$—$x^7$ Fig. 4. Fig. 8 is an enlarged section on line $x^{11}$—$x^{11}$ Fig. 2. Fig. 9 is a perspective view of the center member of the spreading cam. Fig. 10 is a perspective view of one of the outer members with which the spreading cam co-acts. Fig. 11 is a perspective view of the other outer member with which the spreading cam co-acts. Fig. 12 is a side elevation of the cam and mechanism which actuates the spreading cam. Fig. 13 is an enlarged section on line $x^{16}$—$x^{16}$ of Fig. 3, showing the nail in position ready to be driven. Fig. 14 is a view similar to Fig. 16, showing the nail driven, the nail driving parts not having yet retracted. Fig. 15 is a side elevation on an enlarged scale of the device, shown in Fig. 16. Fig. 16 is a horizontal section on line $x^{19}$—$x^{19}$ of Fig. 18. Fig. 17 is a side elevation of the cam and mechanism which raises and lowers the shook supporting post. Fig. 18 is a side elevation of the shook gate. Fig. 19 is a side elevation of the mechanism which supports the rear piece of shook of a two piece bottom or side. Fig. 20 is a perspective view of one of the table end plates. Fig. 21 is an end elevation of the cam which actuates the spreading cam. Fig. 22 is an elevation of the mechanism which rotates the clamp disks. Fig. 23 is a perspective view showing the manner of clamping the nail receiving hoppers. Fig. 24 is a perspective view of the cross bar which carries the nail driving mechanism. Fig. 25 is a side elevation of a shook supporting post and shook hopper constructed for the purpose of handling two piece sides and bottoms.

The box consists of relatively thick end pieces 1, see Fig. 5, and of side boards 2, and bottom boards 3. The ends 1 are arranged in a vertical position and supported in inclined troughs 4, there being one trough in inclined troughs on each side of the machine, as shown clearly in Figs. 1 and 5. Follower weights 4ª are arranged in the respective troughs to move the end pieces 1. Each lower or innermost end piece 1 rests against a frame 5. The shook forming the sides 2 and bottoms 3 is arranged horizontally with the sides alternating with the bottoms, that is to say, first is a side, then comes shook for the bottom of the box, then boards for two sides, then a bottom board and so on. Each bottom and side may consist of more than one piece of board, for example, the bottom 3 may consist of two narrow boards which when placed side by side will form the bottom of the box. The bottoms 3 and sides 2 are kept in vertical alinement between two vertical side plates 6 suitably secured to the frame 7 of the machine, and the lowermost board, either bottom or side, as the case may be, rests upon the upper bars of the frames 5 before referred to. The slant of the troughs 4 is sufficient to cause the bottoms 1 to feed by gravity, while the sides and bottoms also feed by gravity as fast as they are removed from underneath the pile.

Extending longitudinally and secured to the frames 5 are stationary rods 8 forming ways upon which a carrier is slidably mounted. This carrier comprises two blocks 9, (see Figs. 4 and 5) which are connected by a rod 10 on which is a sleeve 11. In the upper end of each block 9 is pivoted a pin 12 having a square head 13 in which is rotatably mounted the rear end of a shaft 14, (see Fig. 4.) The forward end of each shaft 14 is journaled in a block 15 and each block 15 is provided with a roller 16 which is adapted to ride on a rail 17, the rear end of each rail 17 being pivoted on a rod 18, as clearly shown in Figs. 3, 4 and 5. The rails 17 near the front end are connected by a strap 19, as shown in Figs. 3 and 5. The two square heads 15 are tied together by a strap 20, as shown in Figs. 3 and 5. Thus the track rails 17 may be swung up and down on a long radius of which the shaft 18 is the center, while the shafts 14 with their blocks 15 may also be swung up and down pivoted at pins 12 on a much shorter radius. Projecting forwardly from each block 15 is a revoluble shook supporting post 21 which is adapted to rotate with the shaft 14, and each post 21 is provided with three studs 22, 23 and 24, the studs 22 and 24 being in the same plane of rotation and stud 23 being somewhat back thereof on account of the difference in width between a bottom and a side. When the carrier is retracted the bars 21 lie under the lowermost shook. The operation of the parts is so timed that if the lowermost piece of shook is a bottom piece 3 then each stud 23 will lie against the rear edge of the bottom piece 3 and as the carrier advances the studs will push the bottom piece 3 out from under the pack and carry the bottom piece forward as it rests upon the bars 21. When the bars 21 have carried the bottom piece to the proper point the bars are at the end of their stroke and they then drop below the bottom piece and leave the same resting upon two end pieces 1 which have previously been placed in position in a manner to be described hereinafter. The manner in which the carrier is actuated is as follows: A link 25 is pivoted at its upper end to a bracket 26 which is secured to the bar 19, as shown in Fig. 5, and the lower end of link 25 is pivoted to an arm 27, as shown in Fig. 3 and Fig. 17, which is loosely mounted on shaft 28. The forward end of the arm 27 is formed as a curved hook 29, as shown in detail in Fig. 17, and is provided with a roller 30 which is adapted to ride on a cam 31 its entering end having a roller 32 which strikes against roller 30 in lifting the lever 27. The cam 31 is cast on the side of a gear 33 mounted on shaft 34 which is mounted in a journal 35. A pitman 36 is connected to the gear 33 at one end, and at the other end is connected to an arm 37, pivoted at its lower end to a shaft 38. The upper end of the arm 37 is provided with a slotted fork 39 which engages the sleeve 11 on bar 10 so that as gear 33 rotates and arm 37 is rocked it reciprocates the carrier. The cam 31 is so timed that when the carrier reaches the forward end of the stroke the lever 27 is allowed to drop which lowers the supporting bars 21 from under the shook and it remains in this lower position while the carrier is being retracted by the rearwardly swinging arm 37, and the carrier thus being lowered during its return stroke causes the studs 23 to ride back freely under the stack of shook. During the next forward stroke of the carrier a side must be carried forward instead of a bottom as the bottom has just previously been carried out as just described, and as the side shook is narrower than the bottom shook a stud 24 must be moved into position, which is accomplished by partially turning shafts 14. On the rear end of each shaft 14 is a ratchet 40 which is engaged by a retaining pawl 41. At the forward end of each shaft 14 is a ratchet 42 which is actuated by a spring pressed pawl 43 carried on an oscillating block 44 which is journaled loosely on shaft 14 and provided with a segmental gear 45 which meshes with a vertical rack 46 rigidly mounted on the forward end of each carrier block 9. Each shaft 14 in moving down causes the segmental gear 45 to be rotated by the stationary rack 46, which turns the oscillating block 44 in one direction causing the pawl to engage with a new tooth of the ratchet 42 so that when the shaft 14 again swings up, the oscillating block 44 in turning in the other direction will operate pawl 43 and thus actuate the ratchet 42 and turn the shaft 14 thus bringing up stud 24 into position. This rotation of shaft 14 does not occur, however, until the carrier is at the rear end of its stroke at which time the cam 31 lifts lever 27. The studs 24 having thus been turned into position, as the carrier now moves forward through its second stroke, these studs 24 press against the rear edge of the lowermost piece of shook, forming a side, and carry the side forward and deposit it upon the ends 1 of the box in a manner similar to that in which it deposits the bottom upon the ends of the boxes, previously described. The box ends having been turned one quarter around in the meantime, as will be described, the boards 1 which are to form the ends of the box are carried forward by the following mechanism: Referring to Figs. 4 and 5 a pair of fingers 60 is pivoted to each carrier block 9, each finger having a slot 61 into which projects a pin 62 for limiting its lateral movement. Each finger 60 is pivoted to the block 9 at 63, and as shown in Fig. 3 a double flat spring 64 serves to press each pair of fingers 60 outwardly. The fingers 60 during every third forward stroke of the carrier are permitted to spring outwardly into the relative lateral position shown in Fig. 4 and their ends thus strike against the rear edges of the two innermost end pieces 1 and push the end pieces 1 forward as the fingers 60 advance with the carrier. As the carrier retracts the fingers 60 are pressed inwardly by the two innermost end pieces 1 which have in the meantime been moved into position, and during the next two forward strokes of the carrier the fingers 60 are held in so as to escape the end pieces and prevent them from being carried forward because during these two forward strokes of the carrier the bottom is carried at one stroke and one side is carried at the other stroke, while the end pieces and a new side are to be carried at the fourth stroke or first stroke on a new box. The devices for controlling the lateral movement of the fingers 60 comprise vertical controlling bars 65, each bar 65 being slotted to slide on studs 66 secured to the top and bottom bars of the frame 5. Each controlling bar 65 is offset to form two notches 67, as shown in Fig. 6. A slotted lever 68 engages each bar 65 and is pivoted at 69. The bars 68 are actuated simultaneously by two cams 70 on a shaft 71. The cams 70 are so timed that they hold the lever 68 elevated and the bars 65 lifted during the two forward strokes of the carrier while it is carrying forward the bottom and one side, while at the beginning of the next or first stroke the cams 70 allow the arms 68 to drop, thereby lowering the bars 65 and bringing notches 67 into the path of movement of the fingers 60 so that the latter are permitted to be sprung outwardly and ride forward through the notches 67 while in their extended position, and as they thus move forward they strike against the rear edges of the end pieces 1 and carry them forward. During the other two forward strokes of the carrier the controlling bars 65 are lifted and the notches 67 are above the path of movement of the fingers 60 and thus the fingers 60 are held inwardly until they have moved forward beyond the controlling bars 65, when they are obviously allowed to spring out, but as the fingers have passed beyond the rear edges of the end pieces at such time they do not advance the same. As the end pieces 1 are carried forward by the fingers 60 the end pieces are guided by curved spring guides 72. In order to hold the board, either shook or end piece, from retracting and insure its remaining in position while the carrier moves back from it, two pawls 73 are provided each having a sharp lip 74 which bites the wood and holds the piece in place, at the same time readily permitting the outward movement of the piece into position. Each pawl 73 is pivoted to an arm 75 each arm 75 being pivoted at 76 to the frame and the function of the arms 75 is to rest loosely on top of the piece of board as it is being moved out and prevent the board from jumping upwardly and assist in holding the board steady during the nailing operation. In order to hold down the shook as it is being carried forward and before it reaches the arms 75 two vertical spring pressed plungers 77 are employed, as clearly shown in Figs. 1 and 3, each plunger being slidably mounted in a bracket 78. The lower end of each plunger 77 is beveled, as shown in Fig. 3, so as to let the board slide smoothly under the plunger. The brackets 78 are secured to a stationary cross bar 79 which constitutes a part of the frame 7.

Owing to the roughness of the boards there is a tendency of the pieces of shook to stick to each other so that when the lowermost piece of shook is carried forward the next uppermost piece would be drawn forward with it, and to prevent this two gates 80 are provided, as shown in Fig. 1, which are mounted on the frame bar 79. As shown in enlarged detail in Fig. 21 each gate at its upper end is loosely secured to the frame bar 79 by a bolt 81 so as to be capable of swinging forward from the bar 79. A bolt 82 passes loosely through the gate 80 and is secured to the bar 79. A compression spring 83 is confined by the bolt 82 and normally holds the gate 80 closely against the bar 79. The lower end of the gate 80 is spaced above the supporting bars 21 slightly more than the thickness of a piece of shook, as clearly shown, so that only a single piece of shook can pass under the gate, the latter arresting the forward movement of the next uppermost piece, as indicated. If the piece of shook which is to be carried forward under the gate is warped, as often is the case, the gate will swing forward and yield from the pressure of the outward moving piece of warped shook so as to permit it to pass thereunder. If an unyielding gate were to be employed a warped piece of shook would be apt to stick in passing under the gate.

As shown in Figs. 3 and 4, an arm 90 is pivoted loosely on the shaft 18, and pivoted to the arm 90 is a thrust rod 91 the lower end of which has a fork 92 which slides over the shaft 71 and thus guides the lower end of the thrust rod 91. A cam 93 is operated by the shaft 71 and works against a roller 94 on the thrust rod 91. The shaft 71 carries a sprocket 85 which is connected by a chain 86 to a sprocket 87 on shaft 97, the cam 93 being so timed as to lift the arm 90 through the medium of the thrust rod 91 during the forward stroke of the carrier at a time when the piece of shook which is being carried forward has passed a distance not quite the width of the superimposed shook. Thus as shown in Fig. 19, if the next superimposed shook comprises a bottom 3 consisting of two boards, at the time the side piece 2 passes from under the lefthand bottom piece 3 the arm 90 will be in raised position against the under side of the lefthand lower piece 3 and will support the same. The forward ends of the track rails 17 are offset, as clearly shown in Fig. 3, to form extensions 47 which are flush with the upper faces of supporting bars 21 and will act to hold warped shook flat and prevent it from escaping from pins on the posts 21 which are carrying the shook forward.

The end pieces 1 as they are carried forward ride on tracks 95. The end pieces 1 pass from the tracks 95 on to what may be termed a table which table comprises two end plates 96 which are splined on a shaft 97. Each end plate 96 has three flanges 98, 99, 100, which are arranged 120° apart, the flange 98 lying nearest the shaft 97, the flange 99 lying farthest from the shaft 97 and the flange 100 at an intermediate distance from the shaft 97. Each flange has a beveled edge 101 and a flat edge 102 which is perpendicular to the face of the plate 96. The plates 96 are each turned in unison by the shaft 97. The end pieces, as shown in Fig. 23, are first pushed onto the intermediate flanges 100, the latter at such time standing at the top, the end pieces sliding on the narrow edge 102, the two plates 96 being at this time spaced apart to properly support the two end pieces 1 the requisite distance from each other according to the length of the box. The end pieces 1 are then clamped by mechanism to be described shortly, and a side is nailed to the end pieces, the table in the meantime remaining stationary. After the nailing operation it becomes necessary to turn the ends into a position of receive the bottom and to permit of such turning of the ends 1 the plates 96 are moved away from each other so as to be out of the path of rotation of the end pieces 1. This outward movement of the table plates 96 is accomplished by two levers 103 which are pivoted at 104, the levers 103 having forked ends 105 which engage in grooved collars 106 formed in the respective plates 96. Each lever 103 has an arm 107 carrying a roller 108 which is operated by a cam 109 on a shaft 110, the cam 109 being so timed as to shift the plates 96 outwardly at the proper time. After the end pieces 1 together with boards which have been nailed thereto have been turned to bring another edge of the end pieces 1 at the top the plates 96 are then moved inwardly toward each other by the cams 109, and the beveled faces 101 of the flanges serve to prevent the edges of the flanges from catching the lower edges of the end pieces 1 should the latter have dropped slightly or not be perfectly horizontal. Two upwardly extending bars 111 are provided with offset beveled ends 112, as shown in Figs. 1 and 3. A cross bar 113 unites the upper ends of the bars 111. The respective table plates 96 are provided with three notches 114, as clearly seen in Fig. 20, and as the two plates 96 are moved toward each other one of the notches 114 on each plate slides into engagement with the adjacent tapered end 112 and the latter thus serves to hold the plates 96 rigidly against turning should there be any lost motion or play of the plates 96. Shaft 97 carries a star wheel 115, as shown in Fig. 2, having three arms 116 with rounded ends and three arms 117 with concaved ends. Mounted on the shaft 110 is a cam 118 which is provided with two rollers 119, 120. As the cam 118 rotates in the direction of the arrow in Fig. 2, the roller 119 strikes the concavity in the arm 117 and rotates the star wheel 115, and before the roller 119 passes out of engagement with the arm 117 the roller 120 engages the succeeding arm 116 and thus further rotates the star wheel so that for each revolution of the cam 118 the star wheel 115 and shaft 97 are turned one-third of a revolution thereby imparting intermittent rotation to the table plates 96. Each flange 98 is provided with a beveled block 121, which I have found advantageous to employ, to catch the corners of the box in nailing the last side, as I have found in practice that the box is liable to jump forward somewhat, which is thus obviated.

The end pieces 1 are maintained in vertical position and rotated by clamping mechanism which comprises two pairs of clamp disks 122, shown in detail in Fig. 8. Each pair of clamp disks comprises an inner disk 123 and an outer disk 124. Each disk has a beveled edge 125 which obviates the end pieces 1 from catching on the edges of the disks. Each inner disk 123 is mounted on a stub shaft 126 which is rotatably mounted in a sleeve 127. There are two sleeves 127 which are respectively shown in detail in Figs. 10 and 11. Each sleeve 127 is prevented from rotating by a stud 128 which projects from the sleeve into a slot 129 formed in the frame, as shown in Fig. 8, and the slots 129 permit longitudinal movement of the sleeves 127. The inner end of each sleeve 127 is provided with a cam face 130. Extending into both sleeves 127 is a shaft 131, and formed on the shaft 131 is a double spreading cam 132 the two cam faces of which co-act with the cams 130 to spread apart the sleeves 127 as cam 132 is rocked. The clamp disks 123 are moved toward each other as the cam 132 relaxes by means of two coil springs 159. An arm 133 projects from the cam 132 and is connected by link 134 with a rock arm 135 which is keyed to the shaft 28, before referred to. A coil spring 136, as shown in Fig. 3, is connected to the rock arm 135 and tends to normally hold the same down and thereby hold the lever 133 down which causes cam 132 to force the two sleeves 127 outwardly and thereby clamp the end pieces 1 between each pair of disks 123 and 124. As shown in Fig. 12 the shaft 28 is operated by a rock arm 137 which is connected by a link 138 with a cam lever 139 pivoted at 140 and having a roller 141 which rides on cam 118, before referred to. The cam 118 is a double cam, having as shown in Figs. 12, and 21, a portion 142 with a path of movement under the roller 141. The remainder of cam 118 is for operating another element which will be described later. At the entering end of the cam 142 is a roller 143 which first contacts with roller 141 to lift the lever 139, while the rear end of cam 142 is rounded, as at 144, and when the roller 141 rolls off from the end 144 the roller 141 is unsupported and does not ride on any cam portion, but the lever 139 is supported by certain parts connected with it, as will be described.

One of the clamp disks 124 is mounted on a shaft 145 which is journaled in, and extends through, the frame 7, as shown in Fig. 8, while the other clamp disk 124 is mounted on a shaft 146 which does not extend through the frame 7. A wedge bar 147 is connected to the rock lever 139, as shown in Fig. 12, and as shown in Fig. 8 extends up through a slotted block 148, the upper end of the wedge bar 147 having a wedge 149 which operates against the protruding end of shaft 145, and as the lever 139 drops off from the cam 118 to allow the spring 136 to tighten the cam 132 and wedge the end pieces 1 between the cam disks, the wedge 149 drops with the lever 139 and automatically takes up any end play of the clamping disks. The link 147 is slotted at 147ᵃ so that the initial upward movement of lever 139 will act to release the clamp disks and allow the wedge 149 to easily slide in or out.

Each clamp disk 124 has four projecting pins 150 and each clamp disk 124 is normally held against accidental rotation by a flat spring 151, as shown in Fig. 2, which spring has a bent portion adapted to snap onto a pin at the conclusion of each turning movement of the clamp disk so that its motion will be arrested at exactly the proper point. An oscillating block 152 is mounted on shafts 145 and 146, as shown in Figs. 8 and 2, and in detail in Fig. 22, and a spring pressed latch 153 is mounted in each block 152. Connected to each block 152 is a link 154 the lower end of which is held in normal position by a coil spring 155, as shown in Fig. 2, and the lower end of each link 154 is connected to a rock lever 156 which is loose on shaft 28 and has an offset end 157. As shown in Fig. 22, each table plate 96 has two pair of pins 158 and the two pairs are spaced 120° apart. When the table plates 96 are in their inner positions, as shown in Fig. 1, the path of the pins 158 does not come under the offset ends 157, as at such time the table ends 96 are stationary and the clamp disks do not need to be turned until the table plates 96 are moved into their outer positions. To permit the turning of the box, the pins 158 have a path of movement under the offset ends 157 and while the table plates 96 are being turned through one-third of a revolution a pair of pins 158 on each plate 96 actuates the associated lever 156 and operates the respective clamp disks 124 through one-quarter of a revolution through the medium of the oscillating latches 153. During the retraction stroke of the latch 153 its beveled end rides backward over the pin 150 and depresses the latch as it passes over the pin, and the clamp disk 124 is at such time held from reverse movement by the retaining spring 151.

I find it advisable to employ a pair of pins 158 in place of a single pin for the reason that a single pin does not give sufficient movement to the lever 156. Each time the table plate 96 is turned it must be turned through one-third of a revolution to present a new flange at the top in a horizontal position, and while the table 96 is moving through one-third of a revolution the actuating mechanism just described, rotates the clamp disk 124 one-fourth of a revolution. During a complete revolution of the table plate 96 the associated clamping disk 124 will only have been moved twice as but two sets of pins 158 are employed. This is for the reason that in making a box one side is first nailed. Then the box must be turned one-quarter of a circle by the clamp disk 124, and at the same time the table 96 must be turned only one-third to permit the box to rest on the next flange. This first turning of the box after the nailing of the first side is accomplished by the first set of pins, while the table plate 96 is moving through its first third of a revolution. The bottom then having been nailed the table plates 96 turn through their second third of a revolution and the second set of pins acting on lever 156 turns the clamp disk 124 through its second fourth of a revolution. The last side of the box having been nailed the table 96 then moves through the last third of its revolution and during this last movement the lever 156 is not actuated as it is not necessary to operate the clamping disk 124, and the latter is spread apart to release the completed box and permit it to be ejected by the incoming end pieces which are to form a fresh box.

A brake drum 160 is mounted on the shaft 97 and a semicircular leather lined brake shoe 161 is yieldingly pressed against the brake drum 160 by two coil compression springs 162.

As clearly shown in Figs. 1 and 2 a pair of guiding fingers 249 depend from each bar 220 and at the end of each bar 220 is a depending curved guiding finger 250 which fingers slide over the edges of the shook and serve to square it up into proper position as the nailing mechanism moves down so that the board is accurately placed before nailing and prior to its being clamped by the downwardly pressed straps 236.

A gear 270 is mounted on the shaft 110 and meshes with a pinion 251 mounted on a shaft 252, as indicated in Fig. 2. The shaft 252 is controlled by a suitable clutch 253. Mounted on the shaft 110 is a gear 254 which meshes with the gear 33 before described and drives the same. A semicircular brake shoe 255 is yieldingly pressed against a brake drum 256 mounted on shaft 252 by means of coil compressed springs 257, as clearly shown in Fig. 3, which brake serves to prevent the shaft 252 and mechanism geared therewith from running too fast. The clutch 253 may be operated by a forked lever 258 which is mounted on a shaft 259, as shown in Fig. 2, the latter having an end lever 260.

The nail driving devices 235, as clearly shown in Fig. 3, are arranged at an angle of about five degrees from the vertical, so that the nails will be driven on a slant and will pass through at least two or three grains of the wood, and thereby more securely nail the box than has been accomplished by automatic machines heretofore.

The following is a brief résumé of the operation of the machine: The end pieces are carried forward, also the shook for the first side, the ends being clamped between the disks and the first side nailed to the ends. After this nailing operation the end plates of the rotating table move out and turn one-third around and simultaneously therewith the clamp disks turn one-fourth around carrying the partially completed box with them so that the bottom edges of the end pieces will be presented at the top ready to receive the shook for the bottom. While the box is being turned the carrier is bringing forward the shook for the bottom and the front edge of the bottom passes onto the end pieces just after the box is squared into position, thus losing no time. As soon as the box stops turning the end plates of the table slide under and the clamping disks loosen. Shook for the bottom is then laid on the end pieces and the clamping disks tighten. Then the bottom is nailed. Then the end plates of the table move out and turn one-third, while the box is turned one-fourth bringing the last side uppermost. Then the table ends move in under the box and the clamp disks loosen permitting the box to settle onto the end plates of the table. Then the shook for the last side moves on into position and the clamping disks then tighten, whereupon the last side is nailed. After the last nailing, the end clamps loosen and the box is ejected by the incoming end pieces which are being carried into place by the carrier to form the next box.

What I claim is:

1. In a box making machine, a carrier, means for supporting the end pieces on each side of the carrier, means for supporting side pieces and bottom pieces above the carrier, means on the carrier for moving said various pieces into nailing position and means for nailing said pieces.

2. In a box making machine, a carrier, means for feeding side pieces and bottom pieces from one point to the carrier, means for feeding one set of end pieces to another part of the carrier, means for feeding another set of end pieces to another part of the carrier, means on the carrier for moving the various pieces into nailing position and means for nailing the pieces together.

3. In a box making machine, a carrier, means for delivering end pieces to each side of the carrier, means for delivering side pieces and bottom pieces to another side of the carrier, means on the carrier for moving the various pieces into nailing position and means for nailing the pieces.

4. In a box making machine, a carrier, means for supporting end pieces in two different packs adjacent the carrier, means for supporting side pieces and bottom pieces in one pack adjacent the carrier, means on the carrier for moving the various pieces into nailing position and means for nailing the pieces together.

5. In a box making machine, a carrier, means for supporting end pieces adjacent to the carrier, means for supporting side pieces and bottom pieces adjacent the carrier, means for simultaneously moving two end pieces and the first side piece into nailing position, means for turning the incomplete box partially around and simultaneously moving forward the bottom piece, mechanism for then moving the bottom piece into nailing position, means for then turning the incomplete box partially around and simultaneously moving forward the last side piece, means for then again operating said mechanism to place the last side piece in nailing position, nailing mechanism, and means for operating the nailing mechanism each time the foregoing parts are in nailing position.

6. In a box nailing machine, end clamps, means for delivering end pieces to the end clamps and clamping the same therebetween, means for carrying forward the first side piece simultaneously with the end pieces into nailing position over the end pieces, means for turning the incomplete box one-quarter around and simultaneously bringing forward the bottom piece, means for supporting the incomplete box squarely in position while said bottom piece is placed thereon in nailing position, means for then turning the incomplete box partially around, means for supporting the incomplete box squarely in position while the last side piece is placed thereon in nailing position, nailing mechanism, and means for operating the nailing mechanism at each time the foregoing parts are in nailing position, and means for opening and closing the end clamps.

7. In a box making machine, a rotatable table for supporting the pieces of the box while it is being nailed, a carrier for delivering the various pieces to said rotatable table, and revoluble end clamps for clamping end pieces of a box to hold them rigidly during nailing and for turning the incomplete box after a nailing operation.

8. In a box making machine, a rotatable table for supporting the end pieces of a box, a carrier for moving end pieces thereto, end clamps for clamping the end pieces, means for operating said end clamps to loosen them while the end pieces are being moved onto the rotatable table, means for operating the end clamps to tighten them and hold the end pieces rigidly during a nailing operation, means for turning the end pieces after a nailing operation, and means for moving the rotatable table out of the path of rotation of the box while the latter is being turned.

9. In a box making machine, a carrier, means for supporting side pieces and bottom pieces in pack form on one side of the carrier, means on the carrier for moving forward a bottom piece at every third forward stroke of the carrier, means on the carrier for moving forward two sides during the two intervening respective forward strokes of the carrier, means for supporting end pieces on opposite sides of the carrier, and means on the carrier for carrying forward two end pieces simultaneously with the first side.

10. In a box making machine, box supporting and turning mechanism, nailing mechanism, a carrier for delivering box pieces to said mechanisms, means for supporting end pieces vertically on opposite sides of the carrier, a pair of fingers on each side of the carrier for pushing forward end pieces to form a box, means for moving the fingers laterally outward during each third forward stroke of the carrier to advance said end pieces, and means for holding said fingers out of engagement with end pieces during the other two forward strokes of the carrier.

11. In a box making machine, box supporting mechanism, nailing mechanism, a carrier for transferring box pieces to said mechanisms, a pair of pivoted fingers on each side of the carrier for pushing end pieces forward with the carrier, means for controlling lateral movement of each pair of fingers comprising a controlling bar having two notches through which the adjacent fingers are adapted to ride when in register therewith, means tending to move the fingers outwardly, and means for shifting each of said controlling bars to bring the notches into register with the fingers at the desired stroke.

12. In a box making machine, a carrier comprising a pair of slidable blocks, a supporting post extending forward from each block, pins spaced circumferentially and longitudinally on each supporting post, each pin being adapted to act as an abutment against the edge of the piece which lies on the supporting post, and means for turning any of said pins into position according to the width of the pieces to be carried forward.

13. In a box making machine, a carrier comprising a pair of slidable blocks, a supporting post extending forward from each block, pins spaced circumferentially and longitudinally on each supporting post, each pin being adapted to act as an abutment against the edge of the piece which lies on the supporting post, and means for turning any of said pins into position according to the width of the pieces to be carried forward comprising a shaft concentric with each supporting post, a ratchet at the rear end of said shaft, a retaining pawl for the ratchet, an actuating ratchet on the front end of said shaft, an oscillating block journaled on the shaft, a spring pressed pawl on the oscillating block actuating said latter ratchet, said oscillating block having teeth formed thereon, a rigidly mounted rack engaging said teeth, whereby, when said shaft and adjacent supporting post are swung bodily, said oscillating block will be actuated by the rack to operate the pawl and ratchet and turn the shaft and supporting post.

14. In a box making machine, box supporting mechanism, nailing mechanism, a pair of substantially horizontal pivoted rails extending to the box supporting mechanism, horizontal rods forming ways, a carrier mounted on said ways comprising two blocks, a rod connecting said blocks, a supporting post having a pivotal connection with each block, a roller traveling on each rail and supporting the adjacent supporting post, means for reciprocating said carrier, and means for delivering side pieces or bottom pieces to said supporting posts.

15. In a box making machine, box supporting mechanism, nailing mechanism, a pair of substantially horizontal pivoted rails extending to the box supporting mechanism, horizontal rods forming ways, a carrier mounted on said ways comprising two blocks, a rod connecting said blocks, a supporting post having a pivotal connection with each block, a roller traveling on each rail and supporting the adjacent supporting post, means for reciprocating said carrier, means for delivering side pieces or bottom pieces to said supporting posts, means for lowering said rails during the retraction stroke of said supporting posts and for raising the rails to bring a pin on said posts behind the edge of a bottom or side piece.

16. In a box making machine, box supporting mechanism, nailing mechanism, a pair of substantially horizontal pivoted rails extending to the box supporting mechanism, horizontal rods forming ways, a carrier mounted on said ways comprising two blocks, a rod connecting said blocks, a supporting post having a pivotal connection with each block, a roller traveling on each rail and supporting the adjacent supporting post, means for reciprocating said carrier, and means for delivering side pieces or bottom pieces to said supporting posts, a strap connecting the rails, a bracket secured to the strap, a link connected to the bracket, a pivoted arm to which the lower end of said link is connected, and mechanism for rocking said arm.

17. In a box making machine, box supporting mechanism, nailing mechanism, a pair of substantially horizontal pivoted rails extending to the box supporting mechanism, horizontal rods forming ways, a carrier mounted on said ways comprising two blocks, a rod connecting said blocks, a supporting post having a pivotal connection with each block, a roller traveling on each rail and supporting the adjacent supporting post, means for reciprocating said carrier, and means for delivering side pieces or bottom pieces to said supporting posts, a strap connecting the rails, a bracket secured to the strap, a link connected to the bracket, a pivoted arm to which the lower end of said link is connected, mechanism for rocking said arm comprising a gear, a cam formed on the gear, a roller at one end of said cam, the end of said arm having a curved hook, a roller on said hook adapted to ride on said cam, and suitable gearing for driving said gear.

18. In a box making machine, box supporting mechanism, nailing mechanism, a pair of substantially horizontal pivoted rails extending to the box supporting mechanism, horizontal rods forming ways, a carrier mounted on said ways comprising two blocks, a rod connecting said blocks, a supporting post having a pivotal connection with each block, a roller traveling on each rail and supporting the adjacent supporting post, means for reciprocating said carrier, and means for delivering side pieces or bottom pieces to said supporting posts, a strap connecting the rails, a bracket secured to the strap, a link connected to the bracket, a pivoted arm to which the lower end of said link is connected, mechanism for rocking said arm comprising a gear, a cam formed on the gear, a roller at one end of said cam, the end of said arm having a curved hook, a roller on said hook adapted to ride on said cam, suitable gearing for driving said gear, a pitman having one end connected to said gear, a vertical swinging arm to which the other end of the pitman is connected, a sleeve on said rod, said vertical arm having a forked end engaging said sleeve.

19. In a box making machine, box supporting mechanism, nailing mechanism, a carrier for transferring box pieces to the supporting mechanism, means for supporting side pieces and bottom pieces above said carrier, a pivoted arm of a length such that its end does not extend under the narrower side pieces but does extend under and support the wider two-piece bottoms, and means for raising said arm into supporting position as soon as the side piece underneath has started its forward movement.

20. In a box making machine, box supporting mechanism, nailing mechanism, a carrier for transferring box pieces to the supporting mechanism, means for supporting side pieces and bottom pieces above said carrier, a pivoted arm of a length such that its end does not extend under the narrower side pieces but does extend under and support the wider two-piece bottoms, and means for raising said arm into supporting position as soon as the side piece underneath has started its forward movement comprising a thrust rod pivoted to said arm having a fork on its lower end, a shaft extending on said fork, a cam on the shaft and a roller on the thrust rod riding on said cam, and suitable gearing for driving said shaft and cam, the cam being so timed as to lift the supporting arm at the proper period.

21. In a box making machine, box supporting mechanism, nailing mechanism, a carrier for moving pieces to the supporting mechanism, a pair of vertically slidable spring pressed plungers having beveled lower ends arranged in the path of movement of the side and bottom pieces, and a gate adjacent each plunger comprising a plate held against longitudinal movement and capable of swinging movement, and a spring normally holding said plate in a vertical position.

22. In a box making machine, a table, a carrier for moving pieces to the table, means for clamping end pieces comprising two pair of clamp disks, each pair of disks comprising an inner disk and an outer disk, a stub shaft supporting each inner disk, two non-revoluble sleeves into which said stub shafts respectively project, each sleeve having a cam face and a double spreading cam between the two sleeves.

23. In a box making machine, a table, a carrier for moving pieces to the table, means for clamping end pieces comprising two pair of clamp disks, each pair of disks comprising an inner disk and an outer disk, a stub shaft supporting each inner disk, two non-revoluble sleeves into which said stub shafts respectively project, each sleeve having a cam face and a double spreading cam between the two sleeves, and coil springs bearing against said sleeves for holding them toward the spreading cam.

24. In a box making machine, a table, a carrier for moving pieces to the table, means for clamping end pieces comprising two pair of clamp disks, each pair of disks comprising an inner disk and an outer disk, a stub shaft supporting each inner disk, two non-revoluble sleeves into which said stub shafts respectively project, each sleeve having a cam face and a double spreading cam between the two sleeves, said disks having beveled edges.

25. In a box making machine, a table, a carrier for moving pieces to the table, means for clamping end pieces comprising two pair of clamp disks, each pair of disks comprising an inner disk and an outer disk, a stub shaft supporting each inner disk, two non-revoluble sleeves into which said stub shafts respectively project, each sleeve having a cam face and a double spreading cam between the two sleeves, and means for imparting a definite amount of longitudinal movement of one of the outer clamp disks.

26. In a box making machine, a table, a carrier for moving pieces to the table, means for clamping end pieces comprising two pair of clamp disks, each pair of disks comprising an inner disk and an outer disk, a stub shaft supporting each inner disk, two non-revoluble sleeves into which said stub shafts respectively project, each sleeve having a cam face and a double spreading cam between the two sleeves, and coil springs bearing against said sleeves for holding them toward the spreading cam, a frame in which said sleeves are journaled, said frame having a slot adjacent each sleeve, and a pin on each sleeve engaging in the adjacent slot.

27. In a box making machine, a table, a carrier for moving pieces to the table, means for clamping end pieces comprising two pair of clamp disks, each pair of disks comprising an inner disk and an outer disk, a stub shaft supporting each inner disk, two non-revoluble sleeves into which said stub shafts respectively project, each sleeve having a cam face and a double spreading cam between the two sleeves, and coil springs bearing against said sleeves for holding them toward the spreading cam, an arm projecting from said spreading cam, a link connected to said arm, and suitable gearing for actuating said link.

28. In a box making machine, a table, a carrier for moving pieces to the table, means for clamping end pieces comprising two pair of clamp disks, each pair of disks comprising an inner disk and an outer disk, a stub shaft supporting each inner disk, two non-revoluble sleeves into which said stub shafts respectively project, each sleeve having a cam face and a double spreading cam between the two sleeves, and coil springs bearing against said sleeves for holding them toward the spreading cam, an arm projecting from said spreading cam, a link connected to said arm, a rock shaft (28), an arm keyed thereto and connected to the other end of said link, and a coiled spring connected to said rock arm and normally holding it depressed.

29. In a box making machine, a table, a carrier for moving pieces to the table, means for clamping end pieces comprising two pair of clamp disks, each pair of disks comprising an inner disk and an outer disk, a stub shaft supporting each inner disk, two non-revoluble sleeves into which said stub shafts respectively project, each sleeve having a cam face and a double spreading cam between the two sleeves, and coil springs bearing against said sleeves for holding them toward the spreading cam an arm projecting from said spreading cam, a link connected to said arm, a rock shaft (28), an arm keyed thereto and connected to the other end of said link, and a coiled spring connected to said rock arm and normally holding it depressed, a rock arm (137) keyed to the shaft (28), a link (138) connected to the rock arm (137), a cam lever (139) connected with link (138), and a roller on cam lever (139) and a cam for operating against said roller.

30. In a box making machine, a table, a carrier for moving pieces to the table, means for clamping end pieces comprising two pair of clamp disks, each pair of disks comprising an inner disk and an outer disk, a stub shaft supporting each inner disk, two non-revoluble sleeves into which said stub shafts respectively project, each sleeve having a cam face and a double spreading cam between the two sleeves, and coil springs bearing against said sleeves for holding them toward the spreading cam, an arm projecting from said spreading cam, a link connected to said arm, a rock shaft (28), an arm keyed thereto and connected to the other end of said link, and a coiled spring connected to said rock arm and normally holding it depressed, a rock arm (137) keyed to the shaft (28), a link (138) connected to the rock arm (137), a cam lever (139) connected with link (138), and a roller on cam lever (139) and a cam for operating against said roller, said cam comprising a portion (142) having a path of movement under said roller and having another portion (226).

31. In a box making machine, means for clamping and turning end pieces comprising two pair of clamps, means for spreading the two inner clamps toward the two outer clamps, a shaft supporting the outer clamp disks, one of said shafts being longitudinally movable, a wedge bar operating against the edge of said movable shaft, a link carrying the wedge bar, and suitable gearing for actuating said link.

32. In a box making machine, means for clamping and turning end pieces comprising two pair of clamps, means for spreading the two inner clamps toward the two outer clamps, a shaft supporting the outer clamp disks, one of said shafts being longitudinally movable, a wedge bar operating against the edge of said movable shaft, a link carrying the wedge bar, a lever (139) connected to said link, a cam for operating said lever.

33. In a box making machine, means for clamping and turning end pieces comprising two pair of clamps, means for spreading the two inner clamps toward the two outer clamps, a shaft supporting the outer clamp disks, one of said shafts being longitudinally movable, a wedge bar operating against the edge of said movable shaft, a link carrying the wedge bar, a lever (139) connected to said link, a cam for operating said lever, said link having a slot (147ª) permitting a certain amount of upward movement of lever 139 before actuating said link.

34. In a box making machine, means for holding and turning end pieces comprising a pair of clamp disks, means for contracting and expanding each pair of clamp disks, four projecting pins on each clamp disk, and a spring having a bent portion adapted to detachably engage any one of said pins to arrest the clamp disk at the proper point.

35. In a box making machine, means for holding and turning end pieces comprising two pair of clamp disks, a shaft supporting the outer disk of each pair, an oscillating block on each outer shaft, a spring pressed latch in each block, a series of pins on the adjacent clamp disks adapted to be actuated by said latch, a link (154) connected to said block, a rock lever connected to said link, and mechanism for actuating said rock lever to actuate said block and intermittently rotate said clamp disk.

36. In a box making machine, means for holding and turning end pieces comprising two pair of clamp disks, a shaft supporting the outer disk of each pair, an oscillating block on each outer shaft, a spring pressed latch in each block, a series of pins on the adjacent clamp disks adapted to be actuated by said latch, a link (154) connected to said block, a rock lever connected to said link, a rotatable table for supporting pieces and comprising end plates located substantially under the respective outer clamp disks, each plate having two pair of pins (158) adapted to actuate the end of rock lever (156).

37. In a box making machine, means for holding and turning end pieces comprising two pair of clamp disks, a shaft supporting the outer disk of each pair, an oscillating block on each outer shaft, a spring pressed latch in each block, a series of pins on the adjacent clamp disks adapted to be actuated by said latch, a link (154) connected to said block, a rock lever connected to said link, a rotatable table for supporting pieces and comprising end plates located substantially under the respective outer clamp disks, each plate having two pair of pins (158) adapted to actuate the end of rock lever (156), means for shifting said table plates longitudinally, thereby bringing said pins out of line with said rock lever.

38. In a box making machine, means for clamping end pieces comprising two pair of clamp disks, means for supporting end pieces comprising a rotatable table under said clamp disks, and means for simultaneously turning said clamp disks through one-quarter of a revolution and said table through one-third of a revolution.

In testimony whereof, I have hereunto set my hand at Los Angeles, California, this 15th day of February, 1909.

ELMER C. NORTHRUP.

In presence of—
GEORGE T. HACKLEY,
FRANK L. A. GRAHAM.